US012781528B2

(12) United States Patent
Güllü et al.

(10) Patent No.: US 12,781,528 B2
(45) Date of Patent: Nov. 3, 2026

(54) LATERAL LOAD RESISTING SYSTEM WITH ENERGY ABSORBING MECHANISMS

(71) Applicant: Texas State University, San Marcos, TX (US)

(72) Inventors: Ahmet Güllü, San Marcos, TX (US); Togay Ozbakkaloglu, San Marcos, TX (US); Ercan Yüksel, Istanbul (TR)

(73) Assignees: Texas State University, San Marcos, TX (US); Istanbul Technical University (TR)

( * ) Notice: Subject to any disclaimer, the term of this patent is extended or adjusted under 35 U.S.C. 154(b) by 402 days.

(21) Appl. No.: 18/419,468

(22) Filed: Jan. 22, 2024

(65) Prior Publication Data

US 2024/0255041 A1 Aug. 1, 2024

Related U.S. Application Data

(60) Provisional application No. 63/442,697, filed on Feb. 1, 2023.

(51) Int. Cl.
*E04H 9/02* (2006.01)
*F16F 7/00* (2006.01)

(52) U.S. Cl.
CPC ........... *E04H 9/0215* (2020.05); *E04H 9/021* (2013.01); *E04H 9/0237* (2020.05); *E04H 9/024* (2013.01); *E04H 9/025* (2013.01); *F16F 7/00* (2013.01)

(58) Field of Classification Search
CPC ..... E04H 9/0215; E04H 9/021; E04H 9/0237; E04H 9/024; E04H 9/025; F16F 7/00; F16F 2224/0258
See application file for complete search history.

(56) References Cited

U.S. PATENT DOCUMENTS 4,019,301 A * 4/1977 Fox ..................... E04F 13/0733 52/837
5,630,298 A 5/1997 Tsai et al.
(Continued)

FOREIGN PATENT DOCUMENTS

CN 100335726 C 9/2007
CN 107864662 A * 3/2018 ............. F16F 15/06
(Continued)

OTHER PUBLICATIONS

Machine Translate KR20230000513A Kim Jinkoo (Year: 2023).*
(Continued)

*Primary Examiner* — Babajide A Demuren
(74) *Attorney, Agent, or Firm* — Robert A. Voigt, Jr.; Shackelford, McKinley & Norton, LLP

(57) ABSTRACT

A lateral load resisting system for transferring lateral forces from the top of a building to the foundation. The lateral load resisting system includes a main frame, a secondary frame, and energy absorbing mechanisms with high damping characteristics, such as energy dissipative cushion dampers, configured to connect the secondary frame with the main frame. The energy absorbing mechanisms are configured to dissipate energy through their deformation, where, in response to lateral movement, the energy absorbing mechanisms generate only lateral forces that form force couples between the supports of the secondary frame. In this manner, by implementing energy absorbing mechanisms with high damping characteristics, the lateral load resisting system is able to absorb energy during lateral loading conditions, such as an earthquake, to prevent damage to the structure.

20 Claims, 4 Drawing Sheets

(56) References Cited

U.S. PATENT DOCUMENTS

| | | | | | |
|---|---|---|---|---|---|
| 6,123,485 | A * | 9/2000 | Mirmiran | E02D 31/02 405/232 |
| 10,106,979 | B2 * | 10/2018 | Lee | E04B 1/98 |
| 10,590,670 | B2 * | 3/2020 | Ferrari | E04H 9/0237 |
| 2017/0138043 | A1 | 5/2017 | Pryor et al. | |

FOREIGN PATENT DOCUMENTS

| | | | | | |
|---|---|---|---|---|---|
| CN | 107869200 | A * | 4/2018 | E04H 9/02 |
| CN | 108360903 | A * | 8/2018 | E04H 9/0235 |
| CN | 113463786 | A * | 10/2021 | E01D 19/00 |
| CN | 115095185 | A * | 9/2022 | E04H 9/0237 |
| KR | 20150032264 | A | 3/2015 | |
| KR | 101920417 | B1 | 11/2018 | |
| KR | 20230000237 | A * | 1/2023 | E04H 9/0215 |
| KR | 20230000513 | A * | 1/2023 | E04H 9/0215 |

OTHER PUBLICATIONS

Gullu et al., "Piecewise Exact Solution of the Seismic Energy Balance Equation and its Verification by Shake Table Tests," Archives of Civil and Mechanical Engineering, vol. 22, No. 3, Apr. 2022, pp. 1-14.
Ahmed et al., "Proposed Configurations for the Use of Smart Dampers with Bracings in Tall Buildings," Smart Materials Research, Article ID 251543, 2012, pp. 1-16.
Barbagallo et al., "Design for Seismic Upgrading of Existing RC Frames by Friction Dampers," Ingegneria Sismica, vol. 37, No. 1, Jan. 2020, pp. 5-18.
Dong et al., "Design Parameters and Material-Scale Damage Evolution of Seismic Upgraded RC Frames by Viscoelastic Haunch Bracing-Dampers," Earthquake Engineering Structural Dynamics, vol. 50, No. 5, Apr. 2021, pp. 1476-1491.
Ghafouri-Nejad et al., "Parametric Study on Seismic Response of the Knee Braced Frame with Friction Damper," Structures, vol. 32, No. 3, Aug. 2021, pp. 2073-2087.
Gupta et al., "Performance-Based Design of RC Structures Subjected to Seismic Load Using a Hybrid Retrofitting Method with Friction Damper and Steel Bracing," Computational Engineering and Physical Modeling, 5-1, 2022, pp. 19-35.
Gullu et al., "Simultaneous Multi-Objective Optimal Sizing of Energy Dissipative Steel Cushions for Transversal Loading," International Journal of Structural Stability and Dynamics, vol. 22, No. 1, 2022, pp. 1-18.
Gullu et al., "Multi-Objective Optimal Sizing of Energy Dissipative Steel Cushions for Longitudinal Loading," Structural and Multidisciplinary Optimization, vol. 63, No. 6, Jun. 2021, pp. 2955-2967.
Gullu et al., "Characterization of Energy Dissipative Cushions Made of Ni—Ti Shape Memory Alloy," Smart Materials and Structures, vol. 31, No. 1, Nov. 2021, pp. 1-16.
Gullu et al., "Numerical Modeling of Energy Dissipative Steel Cushions," International Journal of Steel Structures, vol. 19, No. 4, 2019, pp. 1331-1341.
Hu et al., "Experimental Investigation on the Behavior of Bracing Damper Systems by Utilizing Metallic Yielding and Recentering Material Devices," Advances in Materials Science and Engineering, Article ID 2813058, 2018, pp. 1-15.
Hwang et al., "Rotational Inertia Dampers with Toggle Bracing for Vibration Control of a Building Structure," Engineering Structures, vol. 29, No. 6, Jun. 2007, pp. 1201-1208.
Karadogan et al., "Cyclic Behavior of Reinforced Concrete Cladding Panels Connected with Energy Dissipative Steel Cushions," Engineering Structures, vol. 189, Jun. 15, 2019, pp. 423-439.
Kiadarbandsari et al., "Analytical and Experimental Investigation of Steel Friction Dampers and Horizontal Brake Pads in Chevron Frames Under Cyclic Loads," Structures, vol. 40, 2022, pp. 256-272.
Kurata et al., "Rapid Seismic Rehabilitation Strategy: Concept and Testing of Cable Bracing with Couples Resisting Damper," Journal of Structural Engineering, Archive, vol. 138, No. 3, Mar. 2012, pp. 354-362.
Labibi et al., "Experimental and Numerical Study of Pyramidal Steel Damper for Use in Frames with Diagonal Bracing," International Journal of Steel Structures, vol. 22, 2022, pp. 1537-1556.
Lee et al., "Bracing Systems for Installation of MR Dampers in a Building Structure," Journal of Intelligent Material Systems and Structures, vol. 18, No. 11, 2007, pp. 1111-1120.
Mirzai et al., "Experimental Investigation of Smart Shear Dampers with Re-Centering and Friction Devices," Journal of Building Engineering, vol. 35, Mar. 2021, pp. 1-13.
Monir et al., "A Modified Friction Damper for Diagonal Bracing of Structures," Journal of Constructional Steel Research, vol. 87, Aug. 2013, pp. 17-30.
Nezhad et al., "Experimental and Analytical Evaluation of the Seismic Performance of Y-Shaped Braces Equipped with Yielding Diagonal Dampers," Journal of Building Engineering, vol. 42, Oct. 2021, pp. 1-11.
Ozkaynak et al., "Uni-Axial Behavior of Energy Dissipative Steel Cushions," Steel and Composite Structures, vol. 27, No. 6, May 2018, pp. 661-674.
Hasan Ozkaynak, "Model Proposal for Steel Cushions for Use in Reinforced Concrete Frames," KSCE Journal of Civil Engineering, vol. 21, 2017, pp. 2717-2727.
Hasan Ozkaynak, "The Effects of Special Metallic Dampers on the Seismic Behavior of a Vulnerable RC Frame," Structural Engineering and Mechanics, vol. 61, No. 4, 2017, pp. 483-496.
Rosario Pecora, "A Practical Approach for the Mitigation of Seismic-Induced Vibrations in Slender Metallic Structures Through Magnetorheological Fluid Dampers," Applied Sciences, vol. 12, 2022, pp. 1-39.
Soydan et al., "Retrofitting of Pinned Beam-col. Connections in RC Precast Frames Using Lead Extrusion Dampers," Bulletin of Earthquake Engineering, vol. 16, No. 3, Mar. 2018, pp. 1273-1292.
Soydan et al., "Seismic Performance Improvement of Single-Storey Precast Reinforced Concrete Industrial Buildings in Use," Soil Dynamics and Earthquake Engineering, vol. 135, No. 1, Aug. 2020, pp. 1-12.
Yuksel et al., "Behavior of Steel Cushions Subjected to Combined Actions," Bulletin of Earthquake Engineering, vol. 16, No. 4, Feb. 2018, pp. 707-729.
Zareie et al., "Dynamic Response of Frame Structures with Shape Memory Alloy -Magnetorheological Fluid-Based Bracing System by Nonlinear Time-History Analysis," Journal of Building Engineering, vol. 43, No. 12, Jun. 2021, pp. 1-11.
Zareie et al., "A Novel SMA-Magnetorheological Hybrid Bracing System for Seismic Control," Engineering Structures, Oct. 2021, pp. 1-11.

* cited by examiner

LATERAL LOAD RESISTING SYSTEM WITH ENERGY ABSORBING MECHANISMS

TECHNICAL FIELD

The present disclosure relates generally to lateral load resisting systems, and more particularly to lateral load resisting systems with energy absorbing mechanisms with high damping characteristics (e.g., energy dissipative cushion dampers) connecting the main frame with the secondary frame.

BACKGROUND

Lateral load resisting systems typically consist of horizontal and vertical elements connected together so as to transfer lateral forces from the top of a building to the foundations. That is, lateral load resisting systems are designed to protect buildings from lateral loads, such as in the form of seismic and wind loads. Lateral load resisting systems are designed to effectively control the excessive drift due to wind and earthquakes and thus minimize the risk of damage to the building.

Existing lateral load resisting systems utilize shear walls and braces to increase lateral stiffness in building structures. Lateral stiffness is desired to be increased in order to minimize lateral motion under loading conditions, such as in the form of seismic and wind loads. A shear wall is a vertical element of a system that is designed to resist in-plane lateral forces, typically wind and seismic loads. A shear wall resists loads parallel to the plane of the wall. Shear walls are typically light-framed or braced wooden walls with shear panels, reinforced concrete walls, reinforced masonry walls or steel plates. Braces or "bracing units" are full-height sheathed segments of the exterior wall without openings or vertical or horizontal offsets.

While lateral stiffness is desired to be increased in order to minimize lateral motion under loading conditions, if the structures are too stiff, the stresses in the joints are higher, which would lead to premature failure when subjected to high impulse loads, such as high winds and earthquakes. Therefore, some structural compliance or damping is desired to absorb energy during lateral loading conditions, such as an earthquake, to prevent damage to the structure.

Unfortunately, existing lateral load resisting systems utilize shear walls and braces which have low damping characteristics, which can result in greater structural damage, such as due to earthquakes. Additionally, when such existing lateral load resisting systems are placed on the outer frames, which is preferred from a structural engineering perspective, such placement is generally undesirable aesthetically for residential and office buildings. Furthermore, such placement limits the window configuration and prevents natural light from entering the building, which can result in higher energy consumption.

Furthermore, for retrofit applications, the beam-to-column joints are typically heavily reinforced making the addition of shear walls or bracing units of the lateral load resisting systems difficult to implement.

As a result, current lateral load resisting systems may cause greater structural damage to the buildings they are designed to protect due to having low damping characteristics. Furthermore, the placement of current lateral load resisting systems may be aesthetically undesirable and prevent natural light from entering the building, which can result in higher energy consumption. Additionally, for retrofit applications, current lateral load resisting systems require attachment to the beam-to-column joints, which are typically heavily reinforced, making the addition of shear walls or bracing units difficult to implement.

SUMMARY

In one embodiment of the present disclosure, a lateral load resisting system comprises a main frame. The lateral load resisting system further comprises a secondary frame. Furthermore, the lateral load resisting system comprises energy absorbing mechanisms configured to connect the secondary frame with the main frame, where the energy absorbing mechanisms are further configured to dissipate energy through their deformation, and where, in response to lateral movement, the energy absorbing mechanisms generate only lateral forces that form force couples between supports of the secondary frame.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
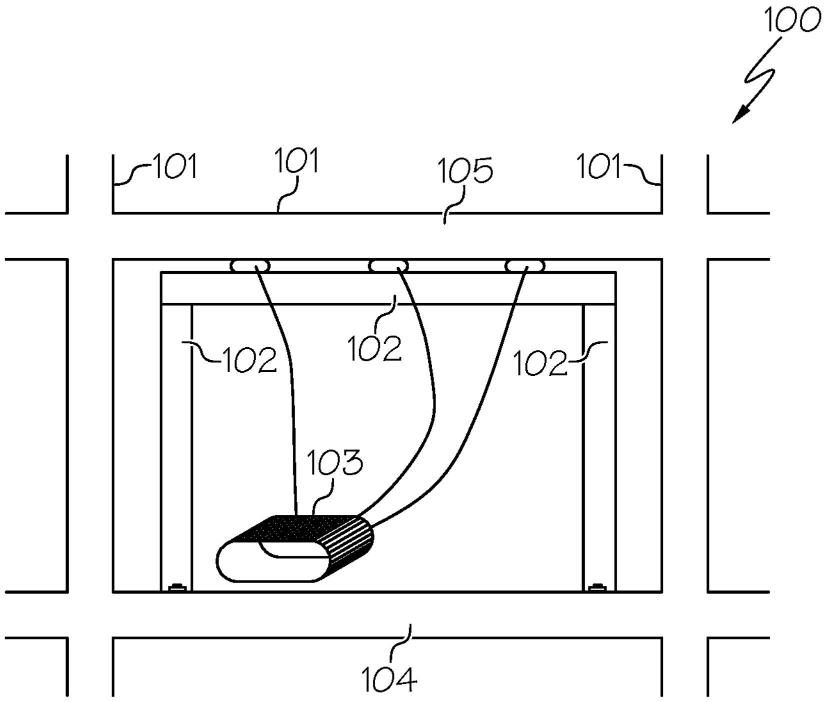
FIG. 1 illustrates a lateral load resisting system with energy absorbing mechanisms with high damping characteristics in accordance with an embodiment of the present disclosure.

As stated above, lateral load resisting systems typically consist of horizontal and vertical elements connected together so as to transfer lateral forces from the top of a building to the foundations. That is, lateral load resisting systems are designed to protect buildings from lateral loads, such as in the form of seismic and wind loads. Lateral load resisting systems are designed to effectively control the excessive drift due to wind and earthquakes and thus minimize the risk of damage to the building.

Existing lateral load resisting systems utilize shear walls and braces to increase lateral stiffness in building structures. Lateral stiffness is desired to be increased in order to minimize lateral motion under loading conditions, such as in the form of seismic and wind loads. A shear wall is a vertical element of a system that is designed to resist in-plane lateral forces, typically wind and seismic loads. A shear wall resists loads parallel to the plane of the wall. Shear walls are typically light-framed or braced wooden walls with shear panels, reinforced concrete walls, reinforced masonry walls or steel plates. Braces or "bracing units" are full-height sheathed segments of the exterior wall without openings or vertical or horizontal offsets.

While lateral stiffness is desired to be increased in order to minimize lateral motion under loading conditions, if the structures are too stiff, the stresses in the joints are higher, which would lead to premature failure when subjected to high impulse loads, such as high winds and earthquakes. Therefore, some structural compliance or damping is desired to absorb energy during lateral loading conditions, such as an earthquake, to prevent damage to the structure.

Unfortunately, existing lateral load resisting systems utilize shear walls and braces which have low damping characteristics, which can result in greater structural damage, such as due to earthquakes. Additionally, when such existing lateral load resisting systems are placed on the outer frames, which is preferred from a structural engineering perspective, such placement is generally undesirable aesthetically for residential and office buildings. Furthermore, such placement limits the window configuration and prevents natural light from entering the building, which can result in higher energy consumption.

Furthermore, for retrofit applications, the beam-to-column joints are typically heavily reinforced making the addition of shear walls or bracing units of the lateral load resisting systems difficult to implement.

As a result, current lateral load resisting systems may cause greater structural damage to the buildings they are designed to protect due to having low damping characteristics. Furthermore, the placement of current lateral load resisting systems may be aesthetically undesirable and prevent natural light from entering the building, which can result in higher energy consumption. Additionally, for retrofit applications, current lateral load resisting systems require attachment to the beam-to-column joints, which are typically heavily reinforced, making the addition of shear walls or bracing units difficult to implement.

The embodiments of the present disclosure provide a means for implementing a lateral load resisting system with energy absorbing mechanisms with high damping characteristics (e.g., energy dissipative cushion dampers) connecting the main frame with the secondary frame, where such energy absorbing mechanisms dissipate energy through their deformation and function to self-center a structure (e.g., steel moment-resistant frame structure). Furthermore, the lateral load resisting system of the present disclosure does not utilize a bracing unit thereby enabling the outer frames to remain open, which is more aesthetically pleasing and allows natural light to enter the building which can result in lower energy consumption. Additionally, the lateral load resisting system of the present disclosure does not require attachment to the beam-to-column joints, which makes the design simpler and easier to implement. A further discussion regarding these and other features is provided below.

Referring now to the Figures in detail, FIG. 1 illustrates a lateral load resisting system 100 with energy absorbing mechanisms with high damping characteristics in accordance with an embodiment of the present disclosure. Lateral load resisting system 100 is configured to transfer lateral forces from the top of a building to the foundations. That is, lateral load resisting system 100 is designed to protect buildings from lateral loads, such as in the form of seismic and wind loads.

As shown in FIG. 1, lateral load resisting system 100 includes a main frame(s) 101 and a secondary frame(s) 102 connected to each other through multiple energy absorbing mechanisms 103 (e.g., energy dissipative cushion dampers). In one embodiment, the material of main frame 101 is steel or reinforced concrete. In one embodiment, the material of secondary frame 102 is steel. In one embodiment, energy absorbing mechanisms 103 are made of different metals, such as steel, aluminum and/or copper. In one embodiment, energy absorbing mechanisms 103 are made of shape-memory alloys, which are utilized to enhance self-centering capabilities, such as self-centering a structure (e.g., steel moment-resistant frame structure).

In one embodiment, energy absorbing mechanisms 103 are made from softer metals in comparison to main frame 101 and secondary frame 102, such as aluminum and copper, thereby enabling energy absorbing mechanisms 103 to deform more easily and dissipate energy at relatively lower force levels. That is, energy absorbing mechanisms 103 dissipate energy through their deformation. As a result, such softer metals are utilized by energy absorbing mechanisms 103 for dissipating energy at lower load levels. In contrast, steel may be utilized by energy absorbing mechanisms 103 for high energy dissipation applications.

In one embodiment, secondary frame 102 is connected to a lower frame member (see, e.g., frame member 104) of main frame 101 or to the foundation. In one embodiment, secondary frame 102 is connected to the upper frame member (see, e.g., frame member 105) of main frame 101. In one embodiment, secondary frame 102 resists relative later displacement between successive stories of a building due to being connected to the lower frame member (e.g., frame member 104) of main frame 101 as well as to the upper frame member (e.g., frame member 105) of main frame 101. In one embodiment, secondary frame 102 is connected to the lower frame member (e.g., frame member 104) of steel main frame 101 using bolted connections. In one embodiment, secondary frame 102 is connected to the lower frame member (e.g., frame member 104) of reinforced concrete main frame 101 using epoxy-based connections. In one embodiment, threaded female couplings may be embedded into the reinforced concrete main frame 101. In one embodiment, secondary frame 102 is connected to the upper frame member (e.g., frame member 105) of main frame 101 using energy absorbing mechanisms 103.

Figure 2:
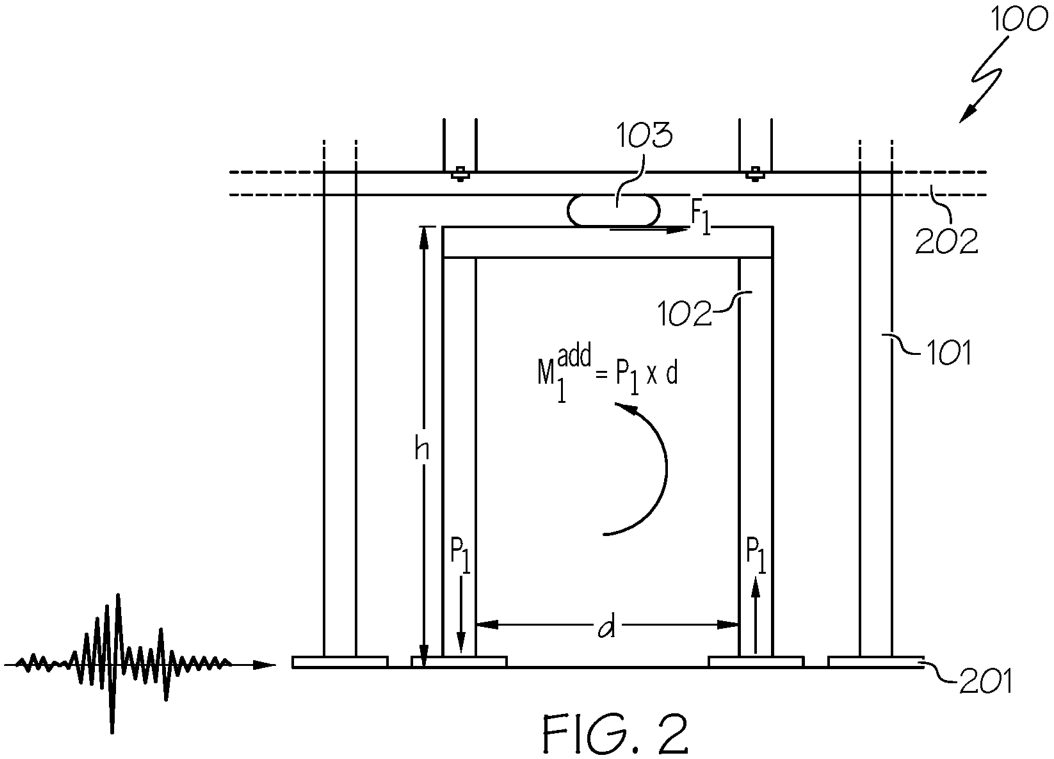
FIG. 2 illustrates dissipating energy using the lateral load resisting system with energy absorbing mechanisms with high damping characteristics in accordance with an embodiment of the present disclosure.

Referring now to FIG. 2, FIG. 2 illustrates dissipating energy using the lateral load resisting system 100 (FIG. 1) with energy absorbing mechanisms 103 with high damping characteristics (e.g., energy dissipative cushion dampers) in accordance with an embodiment of the present disclosure.

In one embodiment, energy absorbing mechanisms 103 behave similar to link elements in eccentric braces and dissipate the imparted energy by the relative displacements of the successive stories of a building. During the lateral movement of the stories of the building, energy absorbing mechanisms 103 (e.g., energy dissipative cushion dampers) generate only lateral forces ($F_1$ in FIG. 2) that form "force couples" between the supports of secondary frame 102 (e.g., $P_1$ at foundation level 201 and $P_i$ at the story levels, such as story level 202). "Force couples," as used herein, are free vectors (their effects on a body are independent of the point of application) in which their effect is to impart angular momentum but not linear momentum. The force couples ($P_i$)

at each story level, such as story level 202, provide an additional moment resisting capacity $$\left(M_{add} = \sum_{i=1}^{n} P_i \times d\right)$$

to the structure shown in FIG. 2.

In one embodiment, energy absorbing mechanisms 103 (e.g., energy dissipative cushion dampers) are made from different materials than main frame 101 and secondary frame 102, such as the high energy dissipation capacity of conventional steel. Furthermore, in one embodiment, energy absorbing mechanisms 103 (e.g., energy dissipative cushion dampers) utilize the super-elastic or self-centering capabilities of shape-memory alloys. A shape-memory alloy, as used herein, is an alloy that can be deformed when cold but returns to its pre-deformed ("remembered") shape when heated. In one embodiment, the utilization of energy absorbing mechanisms 103 (e.g., energy dissipative cushion dampers) imparts self-centering capability to the structure to be protected by lateral load resisting system 100, which yields increased resiliency.

In one embodiment, the shear strength of the beams (e.g., steel) of main frame 101 can be increased using stiffener plates as discussed below in connection with FIG. 3. Shear strength, as used herein, refers to the ability to resist forces that cause the material's internal structure to slide against itself.

Figure 3:
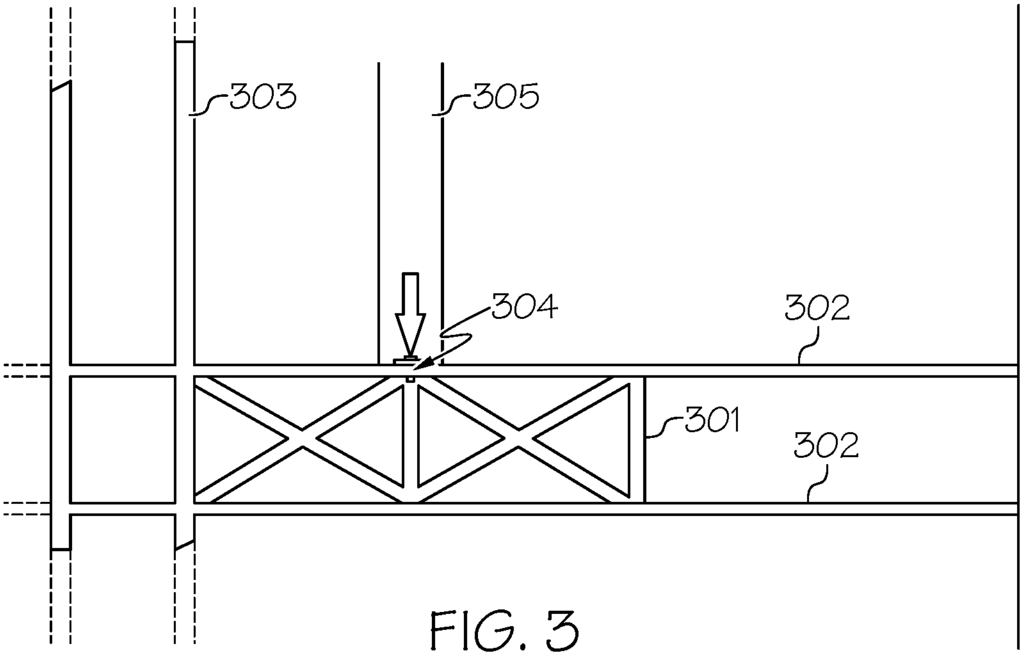
FIG. 3 illustrates increasing the shear strength of the beams of the main frame using stiffener plates in accordance with an embodiment of the present disclosure.

FIG. 3 illustrates increasing the shear strength of the beams (e.g., steel) of main frame 101 using stiffener plates in accordance with an embodiment of the present disclosure.

As illustrated in FIG. 3, stiffener plates 301 ("stiffeners") are attached to beams 302 of main frame 101. Stiffener plates 301, as used herein, refers to plates or sections which are attached to the webs or flanges of beam 302 to stiffen them against out of plane deformations. Flanges, as used herein, correspond to the beam's horizontal components. Webs, as used herein, correspond to the vertical components that connect the flanges.

Furthermore, in one embodiment, a side of a section of stiffener plates 301 is attached to a column 303.

Using the embodiment of FIG. 3, additional shear forces are transmitted to beams 302 of main frame 101 through connections, such as connection 304 to column 305 of secondary frame 102. Shear forces, as used herein, refer to unaligned forces acting on one part of a body in a specific direction, and another part of the body in the opposite direction. As discussed above, in one embodiment, the shear strength of beams 302 (e.g., steel beams) of main frame 101 are increased by stiffener plates 301. In one embodiment, the share strength of beams 302 (e.g., reinforced concrete beams) of main frame 101 are increased using fiber-reinforced polymers or steel jacketing (section steel is wrapped around the four corners (or two corners) of a member to enhance its force-bearing performance).

Figure 4B:
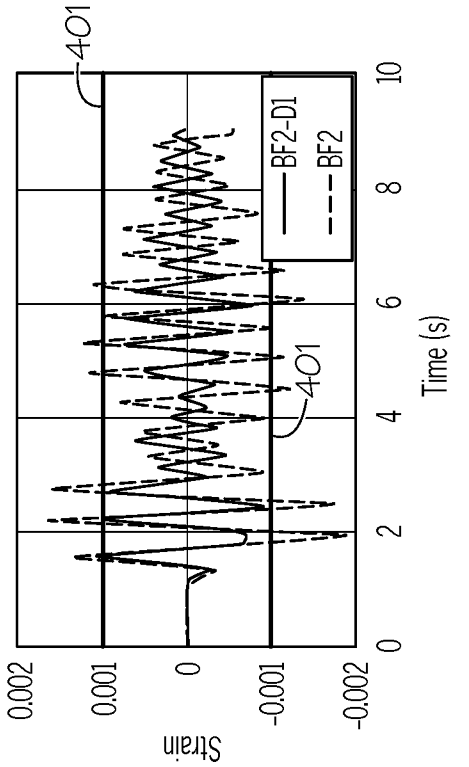
FIGS. 4A-4B illustrate the strain time history of the beams and columns of the specimens, respectively, with and without utilizing the energy absorbing mechanisms in the lateral load resisting system in accordance with an embodiment of the present disclosure.
Figure 4A:
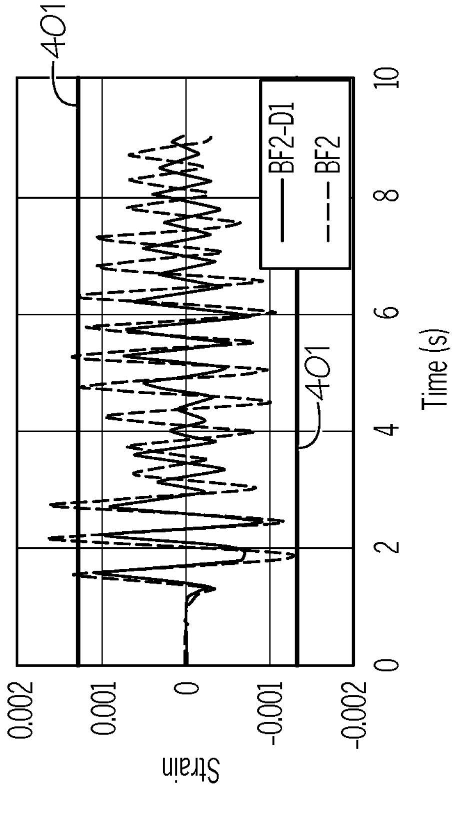

Referring now to FIGS. 4A-4B, FIGS. 4A-4B illustrate the strain time history of the beams and columns of the specimens, respectively, with and without utilizing energy absorbing mechanisms 103 in lateral load resisting system 100 in accordance with an embodiment of the present disclosure.

As shown in FIGS. 4A and 4B, the beams (FIG. 4A) and columns (FIG. 4B) of the control specimen (BF2) exceeded the elastic limit (see lines 401) considerably, whereas, the specimen implementing energy absorbing mechanisms 103 in lateral load resisting system 100 (BF2-D1) remained elastic throughout the loading history.

Figure 5:
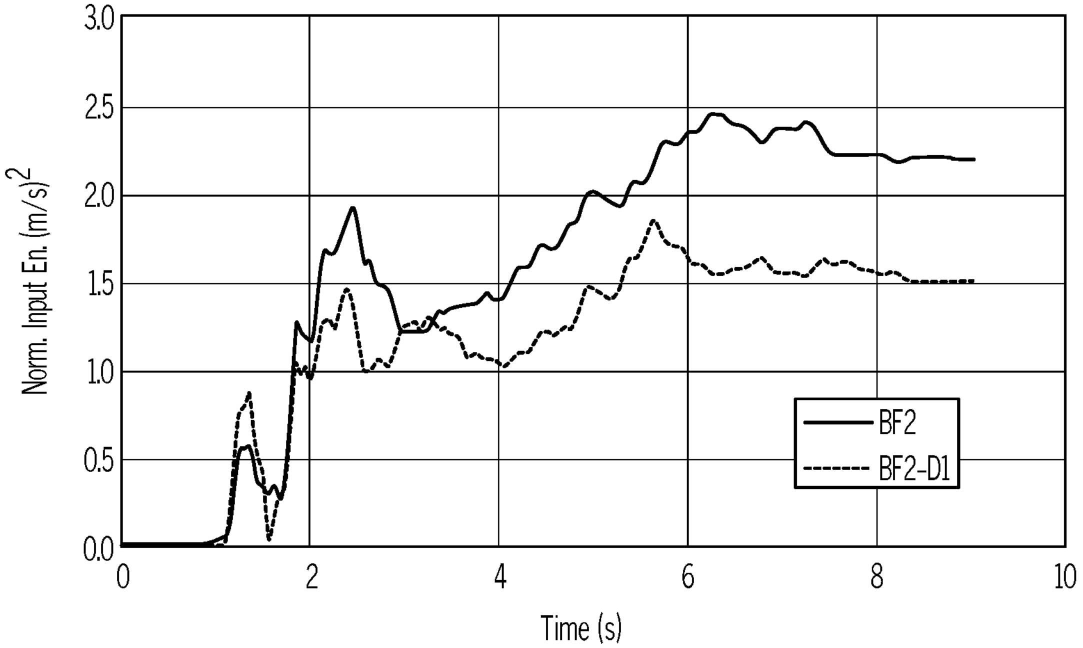
FIG. 5 illustrates the input energy time histories of the specimens with and without the energy absorbing mechanisms in the lateral load resisting system in accordance with an embodiment of the present disclosure.

Referring now to FIG. 5, FIG. 5 illustrates the input energy time histories of the specimens with and without energy absorbing mechanisms 103 in lateral load resisting system 100 in accordance with an embodiment of the present disclosure.

As shown in FIG. 5, the specimen implementing energy absorbing mechanisms 103 in lateral load resisting system 100 (BF2-D1) imparted significantly lower seismic energy (strain) to main frame 101, which translates to lower structural damage to main frame 101, in comparison to the specimen without implementing energy absorbing mechanisms 103 in lateral load resisting system 100 (BF2).

As a result of the foregoing, by implementing energy absorbing mechanisms 103 (e.g., energy dissipative cushion dampers), the lateral load resisting system of the present disclosure does not implement a bracing unit which allows the structure to be protected by the lateral load resisting system while still receiving the full benefits from sunshine. Furthermore, by implementing energy absorbing mechanisms 103 (e.g., energy dissipative cushion dampers), the lateral load resisting system of the present disclosure is not connected to beam-column joints thereby simplifying the installation process.

Furthermore, as a result of the foregoing, by implementing energy absorbing mechanisms 103 (e.g., energy dissipative cushion dampers) with high damping characteristics, the lateral load resisting system of the present disclosure is able to absorb energy during lateral loading conditions, such as an earthquake, to prevent damage to the structure.

There are many benefits in utilizing the lateral load resisting system of the present disclosure, including, but not limited to, increasing lateral load capacity while dissipating lateral energy produced by high winds and earthquakes by utilizing energy absorbing mechanisms 103 (e.g., energy dissipative cushion dampers).

Furthermore, the lateral load resisting system of the present disclosure is not connected to beam-to-column joints thereby making the design simpler and easier to implement, particularly for retrofit applications.

Furthermore, the high damping characteristics of energy absorbing mechanisms 103 (e.g., energy dissipative cushion dampers) can significantly reduce damage to the structural members, such as during an earthquake.

Additionally, different materials can be used for energy absorbing mechanisms 103 (e.g., energy dissipative cushion dampers) based on the design/loading requirements. For example, soft metals, such as aluminum and copper, can be used for lower load levels, while, steel can be used for high energy dissipation applications.

Furthermore, the use of shape-memory alloys for energy absorbing mechanisms 103 (e.g., energy dissipative cushion dampers) can be used for enhanced self-centering capabilities.

Additionally, since there is no bracing unit in the lateral load resisting system of the present disclosure, the outer frames can remain open to full sunlight to reduce energy consumption.

Furthermore, energy absorbing mechanisms 103 (e.g., energy dissipative cushion dampers) may function to self-center the structure, which improves structural resiliency.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A lateral load resisting system, comprising:

a main frame;

a secondary frame; and energy absorbing mechanisms configured to connect said secondary frame with said main frame, wherein said energy absorbing mechanisms dissipate energy through their deformation, wherein, in response to lateral movement, said energy absorbing mechanisms generate only lateral forces that form force couples between supports of said secondary frame, wherein said force couples are free vectors in which their effect is to impart angular momentum but not linear momentum.

2. The lateral load resisting system as recited in claim 1, wherein said energy absorbing mechanisms are made of different metals.

3. The lateral load resisting system as recited in claim 1, wherein said secondary frame is connected to a lower frame member of said main frame or to a foundation as well as connected to an upper frame member of said main frame.

4. The lateral load resisting system as recited in claim 3, wherein said secondary frame resists relative later displacement between successive stories of a building due to being connected to said lower frame member of said main frame and to said upper frame member of said main frame.

5. The lateral load resisting system as recited in claim 4, wherein said secondary frame is connected to said lower frame member of said main frame using bolted connections.

6. The lateral load resisting system as recited in claim 4, wherein said secondary frame is connected to said lower frame member of said main frame using epoxy-based connections.

7. The lateral load resisting system as recited in claim 4, wherein said secondary frame is connected to said upper frame member of said main frame using said energy absorbing mechanisms.

8. The lateral load resisting system as recited in claim 1, wherein a material of said main frame comprises steel.

9. The lateral load resisting system as recited in claim 1, wherein a material of said main frame comprises reinforced concrete.

10. The lateral load resisting system as recited in claim 9, wherein threaded female couplings are embedded into said reinforced concrete.

11. The lateral load resisting system as recited in claim 1, wherein materials of said energy absorbing mechanisms comprise aluminum and copper.

12. The lateral load resisting system as recited in claim 1, wherein materials of said energy absorbing mechanisms comprise one or more of the following: steel, aluminum and copper.

13. The lateral load resisting system as recited in claim 1, wherein materials of said energy absorbing mechanisms comprise shape-memory alloys.

14. The lateral load resisting system as recited in claim 13, wherein said shape-memory alloys are utilized to enhance self-centering capabilities.

15. The lateral load resisting system as recited in claim 1, wherein a material of said secondary frame comprises steel.

16. The lateral load resisting system as recited in claim 1, wherein said energy absorbing mechanisms correspond to cushion dampers.

17. The lateral load resisting system as recited in claim 1, wherein said energy absorbing mechanisms are made from softer metals in comparison to said main frame and said secondary frame.

18. The lateral load resisting system as recited in claim 1, wherein said energy absorbing mechanisms are made from different materials than said main frame and said secondary frame.

19. The lateral load resisting system as recited in claim 1 further comprising:

stiffener plates attached to beams of said main frame to increase shear strength of said beams of said main frame.

20. The lateral load resisting system as recited in claim 1, wherein shear strength of beams of said main frame is increased using fiber-reinforced polymers or steel jacketing.

* * * * *